US012303918B2

(12) United States Patent
Göhmann

(10) Patent No.: US 12,303,918 B2
(45) Date of Patent: May 20, 2025

(54) SEPARATOR FOR SEPARATING A FLOWABLE SUSPENSION INTO TWO FLOWABLE PHASES OF DIFFERENT DENSITY

(71) Applicant: GEA MECHANICAL EQUIPMENT GMBH, Oelde (DE)

(72) Inventor: Rüdiger Göhmann, Oelde (DE)

(73) Assignee: GEA Mechanical Equipment GmbH, Oelde (DE)

( * ) Notice: Subject to any disclaimer, the term of this patent is extended or adjusted under 35 U.S.C. 154(b) by 944 days.

(21) Appl. No.: 17/432,597

(22) PCT Filed: Feb. 26, 2019

(86) PCT No.: PCT/EP2019/054662
§ 371 (c)(1),
(2) Date: Aug. 20, 2021

(87) PCT Pub. No.: WO2020/173545
PCT Pub. Date: Sep. 3, 2020

(65) Prior Publication Data

US 2022/0152631 A1 May 19, 2022

(51) Int. Cl.
*B04B 9/04* (2006.01)
*B04B 1/08* (2006.01)
(Continued)

(52) U.S. Cl.
CPC .................. *B04B 9/04* (2013.01); *B04B 1/08* (2013.01); *B04B 1/12* (2013.01); *B04B 7/02* (2013.01);
(Continued)

(58) Field of Classification Search
CPC .... B04B 9/04; B04B 1/08; B04B 1/12; B04B 7/02; B04B 9/12; B04B 11/02; B04B 15/08
(Continued)

(56) References Cited

U.S. PATENT DOCUMENTS 2,948,572 A * 8/1960 Beams ...................... B04B 9/12 494/83
3,613,989 A * 10/1971 Oyama .................. B01D 59/20 494/32
(Continued)

FOREIGN PATENT DOCUMENTS

CN 104540596 A 4/2015
CN 104582857 A 4/2015
(Continued)

OTHER PUBLICATIONS

Office Action dated Aug. 24, 2023 in related/corresponding KR Application No. 10-2021-7030697.
(Continued)

*Primary Examiner* — Charles Cooley
(74) *Attorney, Agent, or Firm* — PATENT PORTFOLIO BUILDERS PLLC

(57) ABSTRACT

A separator includes a housing that is stationary during operation and designed as a tank having at least two openings. A drum located inside the housing can be rotated about an axis of rotation, the drum having an axis of rotation and at least one opening. A gap is formed at least in sections or continuously between the drum and the housing. The separator also includes a support and drive device having at least two support and/or drive units, which keep the drum suspended inside the housing, supported, and/or set in rotation. One of the support and/or drive units is a first magnetic bearing that at least axially supports the drum and to keep it
(Continued)

Figure 1:
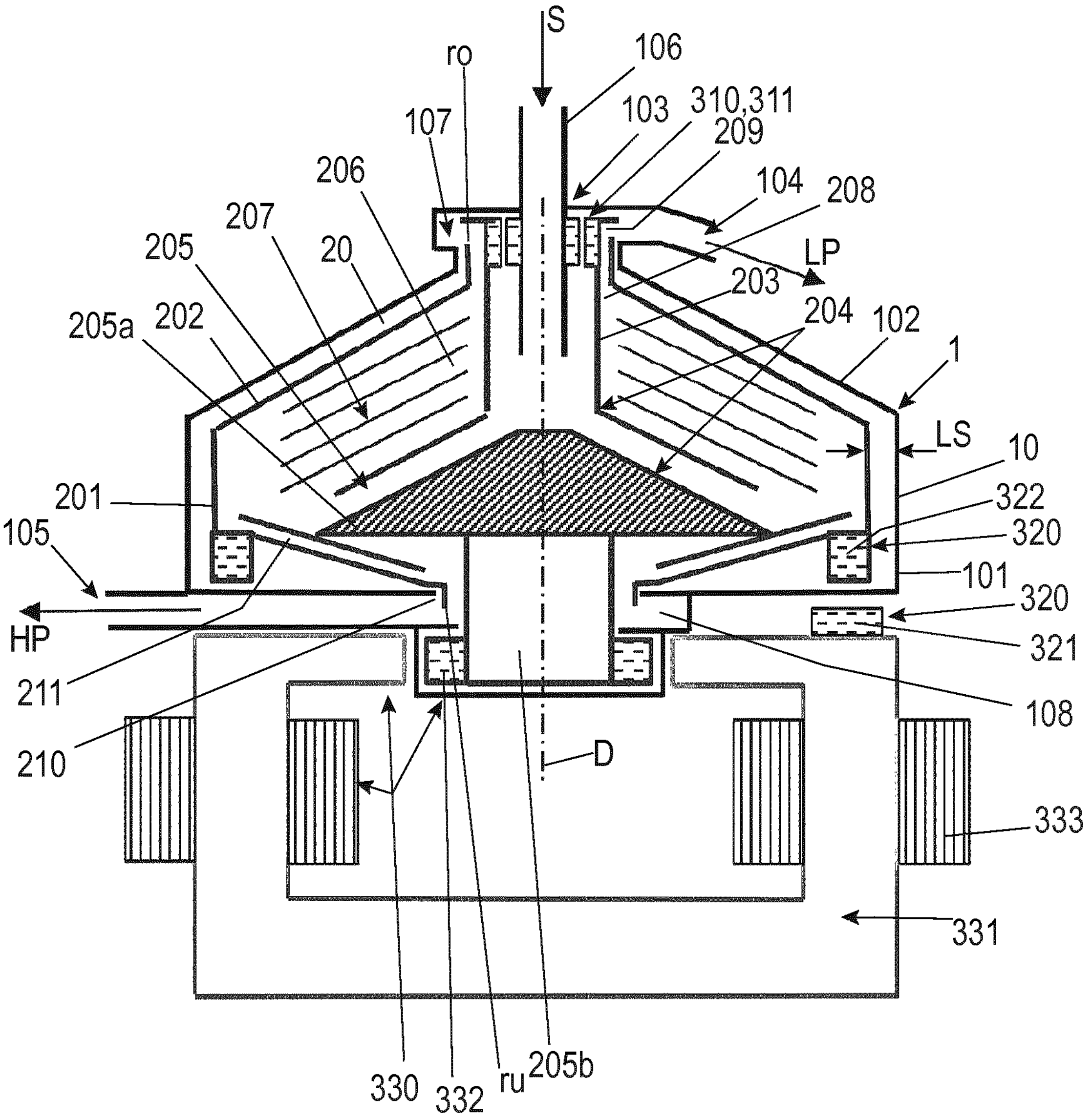

suspended. At least one other of the support and/or drive units is axially supports the drum.

23 Claims, 6 Drawing Sheets

(51) Int. Cl.

| | |
|---|---|
| ***B04B 1/12*** | (2006.01) |
| ***B04B 7/02*** | (2006.01) |
| ***B04B 9/12*** | (2006.01) |
| ***B04B 11/02*** | (2006.01) |
| ***B04B 15/08*** | (2006.01) |

(52) U.S. Cl.
CPC ................ *B04B 9/12* (2013.01); *B04B 11/02* (2013.01); *B04B 15/08* (2013.01)

(58) Field of Classification Search
USPC ......................................... 494/56, 57, 70, 83
See application file for complete search history.

(56) References Cited

U.S. PATENT DOCUMENTS

| | | | | |
|---|---|---|---|---|
| 3,774,376 | A * | 11/1973 | Takashima ............. B01D 53/24 494/900 | |
| 4,262,840 | A | 4/1981 | Groenert et al. | |
| 6,424,067 | B1 | 7/2002 | Samways | |
| 6,976,948 | B1 * | 12/2005 | Hamblad .............. B04B 11/082 494/10 | |
| 9,115,725 | B2 | 8/2015 | Haefliger et al. | |
| 10,029,921 | B2 | 7/2018 | Quiter et al. | |
| 10,335,533 | B2 | 7/2019 | Heide | |
| 2015/0024922 | A1 | 1/2015 | Castillo Gonzalez et al. | |
| 2016/0184836 | A1 | 6/2016 | Mackel et al. | |
| 2016/0279315 | A1 | 9/2016 | Heide | |
| 2017/0008011 | A1 | 1/2017 | Burford et al. | |
| 2021/0031215 | A1 * | 2/2021 | Gohmann ............... B04B 11/02 | |
| 2022/0152631 | A1 * | 5/2022 | Gohmann ................. B04B 7/02 | |

FOREIGN PATENT DOCUMENTS

| | | | |
|---|---|---|---|
| CN | 105916533 | A | 8/2016 |
| CN | 111372687 | A | 7/2020 |
| EP | 2273124 | A1 | 1/2011 |
| EP | 2567754 | A | 3/2013 |
| EP | 2273124 | B1 | 2/2015 |
| EP | 2874752 | B1 | 2/2019 |
| JP | S5775164 | A | 5/1982 |
| JP | S63302969 | A | 12/1988 |
| JP | 2001511702 | A | 8/2001 |
| JP | 2015513445 | A | 5/2015 |
| JP | 2015521542 | A | 7/2015 |
| KR | 20150023739 | A | 3/2015 |
| KR | 1020150036151 | A | 4/2015 |
| WO | 2013116800 | A2 | 8/2013 |
| WO | 2014000829 | A1 | 1/2014 |
| WO | 2015110501 | A1 | 7/2015 |
| WO | 2016142161 | A1 | 9/2016 |
| WO | 2019101624 | A1 | 5/2019 |

OTHER PUBLICATIONS

Office Action dated Dec. 16, 2022 in related/corresponding IN Application No. 202147042866.
Office Action mailed Oct. 25, 2022 in related/corresponding JP Application No. 2021-538093.
Office Action dated Aug. 19, 2022 in related/corresponding CN Application No. 201980092613.3.
International Search Report mailed Jan. 3, 2020 in related/corresponding International Application No. PCT/EP2019/060456.
International Search Report mailed Oct. 29, 2019 in related/corresponding International Application No. PCT/EP2019/054662.
Written Opinion mailed Jan. 3, 2020 in related/corresponding International Application No. PCT/EP2019/060456.
Written Opinion mailed Oct. 29, 2019 in related/corresponding International Application No. PCT/EP2019/054662.
Office Action dated Nov. 4, 2024 in related/corresponding U.S. Appl. No. 17/431,851.

* cited by examiner

SEPARATOR FOR SEPARATING A FLOWABLE SUSPENSION INTO TWO FLOWABLE PHASES OF DIFFERENT DENSITY

BACKGROUND AND SUMMARY OF THE INVENTION

Exemplary embodiments of the invention relate to a separator for separating a flowable suspension in a centrifugal field into at least two flowable phases of different density.

WO 2014/000829 A1 discloses a generic separator for separating a flowable product into different phases, the separator having a rotatable drum with a drum lower part and a drum upper part and a means arranged in the drum for processing a suspension in the centrifugal field of solids or for separating a heavy solid-like phase from a lighter phase in the centrifugal field, wherein one, several or all of the following elements consist of plastic or a plastic composite material: the drum lower part, the drum upper part, the means for clarifying. In this way it is possible to design a part of the drum or preferably even the entire drum—preferably together with the inlet and outlet systems or areas—for single use, which is of particular interest and advantage with regard to the processing of pharmaceutical products such as fermentation broths or the like, since after operation for the processing of a corresponding product batch in preferably continuous operation during the processing of the product batch, no cleaning of the product-contacting parts of the drum has to be carried out, but the drum as a whole can be replaced. Especially from a hygienic point of view, this separator is thus very advantageous. In order to achieve a physical separation between this disposable drum and the drive, a contact-free coupling between the drive and the drum is advantageous.

A device for separating blood into two phases of different density is known from WO 2015/1100501 A1, containing a magnetic drive device and a container that is set into rotary motion about its own axis by the drive device, wherein the container comprises at least one open end and at least one inlet therein, and wherein the container is mounted so as to float magnetically. In this respect, the discharge of the two phases formed during centrifugal separation from the open, cup-like rotor is solved in an unsatisfactory manner, which is problematic.

WO 2015/1100501 A1 proposed to insert the rotating container into a non-rotating housing surrounding the rotating container, which is closed except for an inlet and two outlets. Through the stationary housing, a central inlet pipe is led vertically from above into the rotating container, from which a first phase is again pumped vertically upwards with a kind of peeling member, and wherein the rotating container further has at its vertically upper end an overflow for a second phase, so that this flows during operation into the surrounding non-rotating housing, so that the latter fills during operation until the liquid phase also flows out of the stationary housing again through an overflow to the outside. This design has the disadvantage that higher speeds are hardly feasible, since the inner—rotating—container rotates in the liquid collecting in the housing.

Exemplary embodiments of the invention are directed to solving this problem.

According to the invention a separator for separating a flowable suspension in a centrifugal field into at least two flowable phases of different density is provided. The separator comprises at least the following:

a) a housing that is stationary in operation, designed in the manner of a container, which has at least two openings, b) a drum arranged inside the housing and rotatable about an axis of rotation, the drum having an axis of rotation and at least one opening, c) wherein a gap is formed at least in sections or continuously between the drum and the housing, d) a support and drive device comprising at least two support and/or drive units, by means of which the drum can be kept suspended, supported, and/or made to rotate within the housing, e) wherein one of the support and/or drive units comprises a first magnetic bearing, which is at least designed to axially support the drum and (in any case during operation when the drum is rotating) to keep the drum in suspension, f) wherein at least one other of the support and/or drive units is adapted to axially support the drum.

This separator is also very well suited for operation at higher speeds. In addition, it can also be used well for one-off processing—for example for centrifugal separation of a product batch of a flowable suspension into different phases—and then disposed of. There is a particular advantage here in that, in addition to a lower axial bearing in the first vertical alignment of the axis of rotation, a further axial bearing is provided—for example, at an opposite end of the drum or, optionally, also in the drum. This is because this allows the axis of rotation of the drum to be arranged vertically, but alternatively also advantageously inclined from the vertical. Any arrangement of the axis of rotation is possible. The axis of rotation can therefore be inclined at an angle of 0-180°, from the original vertical, for example, it can also be aligned horizontally, i.e., it can be aligned inclined by 90° to the vertical. Therefore, a suspended arrangement of the drum is also possible, so that the axis of rotation is quasi rotated, so that the inlet opening can be directed downwards, without causing storage problems of the drum.

Insofar as "a first vertical alignment of the axis of rotation" is considered here or below, this means that the position of the elements of the centrifuge in a vertical alignment of the axis of rotation as described can be realized or is realized. Practically, however, the axis of rotation can then also be oriented obliquely to the vertical alignment.

According to an advantageous design, the two support and/or drive units are arranged axially offset from one another in the direction of the axis of rotation and, in a first vertical alignment of the axis of rotation, the lower and/or the upper of the two support and/or drive units is designed to support the drum axially and keep it suspended. It is then preferably provided that, in the first vertical alignment of the axis of rotation D, the second of the support units is arranged above the first magnetic bearing. In addition, therefore, either the lower of the two support and/or drive units can hold the drum in suspension, or the upper or both support and/or drive units can perform this task. It can then advantageously be further provided that one and/or both of the support and/or drive units is/are designed and can be used to set the drum rotating within the housing. It is particularly advantageous if both of the support and/or drive units are designed so that they can optionally be used individually or jointly for this drive.

According to one option, the first of the support and/or drive units is designed as a combined bearing device which, in addition to an axial bearing, also provides a radial bearing for the drum. It can further be provided optionally or alternatively, however, that the second or further of the support and/or drive units is designed as a combined bearing device which, in addition to an axial bearing, also effects a radial bearing of the drum. This advantageous combination can be implemented in different ways in each case.

For example, one or both of the support and/or drive units may have a radial bearing and an axial bearing. The terms “radial bearing” and “axial bearing” are to be considered more functionally. They can be formed by two separate structural bearings or by a single bearing that combines the functions of axial bearing and radial bearing.

It can also be advantageously provided that the at least one or both bearing device(s), which in addition to a radial bearing also effect(s) an axial bearing of the drum, comprise(s) a bearing acting obliquely to the axis of rotation D.

According to the invention, a wide variety of separators can be realized. For example, the separator can be designed as a clarifying device with which a suspension of solids can be clarified, wherein preferably only the clarified suspension can be discharged from the drum and from the housing. However, it is also possible for the separator to be designed as a separating device with which a suspension can be separated alternatively or additionally into two flowable phases, both of which can be discharged from the housing.

It is useful if the housing has at least two openings, one of which is designed for a feed of a suspension to be processed in the centrifugal field and at least one of which is designed for a discharge of a phase of the suspension processed in the centrifugal field. However, it is also conceivable that the housing has exactly three openings or more than three openings. The housing can otherwise be designed to be hermetically closed.

And finally, it can be further advantageously provided that the housing has exclusively three openings and is otherwise designed to be hermetically closed. This makes it easier to create a separator that has the disposable components “drum” and “housing”, whereas at least parts of the support and drive device are reusable.

Thus, it may also be provided that the housing further comprises at least one functional opening, in particular for connecting a device generating a vacuum.

It is conceivable that the drum in the housing has at least one inlet and only one single outlet or a plurality of outlets.

The at least one of the support and/or drive units, which in addition to a radial bearing also provides an axial bearing for the drum, can act permanently and/or electromagnetically. Alternatively, however, it can also be advantageously provided that it acts in the manner of a plain bearing. This variant of the invention is particularly inexpensive and simple to implement in terms of design. In particular, the plain bearing is sufficiently suitable for a centrifuge to be used only once.

According to an advantageous variant, the inlet is formed as an inlet pipe which, with a first vertical alignment of the axis of rotation, extends vertically from above in the direction of the center of the housing. It may also be provided that the two outlets are radially aligned.

In a particularly preferred, advantageous variant, the plain bearing is formed by a mandrel-like inlet pipe, which is supported by a centering tip in a corresponding recess in the distributor base. In this way, a particularly cost-effective bearing is realized, in which several functions—axial bearing, radial bearing, feed function—are advantageously combined. In this way, too, the axis of rotation of the drum can again be arranged inclined to the vertical.

It is also advantageous if the two outlets are aligned radially, wherein both outlets are formed at an upper axial end of the drum when the axis of rotation is aligned vertically for the first time. This results in a single connection side for the discharge of the liquid phases.

In order to achieve particularly high speeds and for particularly stable operation, it can be advantageously provided that the first liquid outlet is formed on the drum in the upper axial region—preferably at the upper axial end—and the second liquid outlet is formed in the lower axial region of the drum—preferably at the lower axial end of a cylindrical section of the drum. However, these outlets can also both be formed at a common end of the drum.

It can also be provided that a further—preferably then a third—of the support and/or drive units is designed to radially support the drum in a first vertical alignment and to set it in rotation.

It can be further advantageously provided that one or more seals are arranged between the drum and the housing—in particular in the region of one or more outlets. In this way, for example, mixing of the liquid phases to be discharged can be reliably avoided if two or both outlet openings are arranged axially next to each other or close to each other, e.g., at the upper axial end of the drum.

It can be further advantageously provided that at least one of the two liquid outlets is associated with a device for adjusting the separation zone within the drum.

A separator can thus be created in which the drum and the housing are designed as a disposable separator and which can be disposed of after a single use, wherein the at least two support and/or drive units are designed to be removably reusable from the outside of the housing.

The invention thus also provides a use of a disposable separator, which is disposable after a single use, wherein the at least two support and/or drive units are removable or detachable from the outside of the housing beforehand.

It should also be noted that features a) to e) also in themselves create an advantageous separator, although further separators according to the invention can be created by combining these features.

In the following, the invention is described in more detail by means of exemplary embodiments with reference to the drawing, wherein further advantageous variants and designs are also discussed. It should be emphasized that the exemplary embodiments discussed below are not intended to describe the invention conclusively, but that variants and equivalents not shown are also feasible and are covered by the claims, wherein:

BRIEF DESCRIPTION OF THE DRAWING FIGURES

Figure 2:
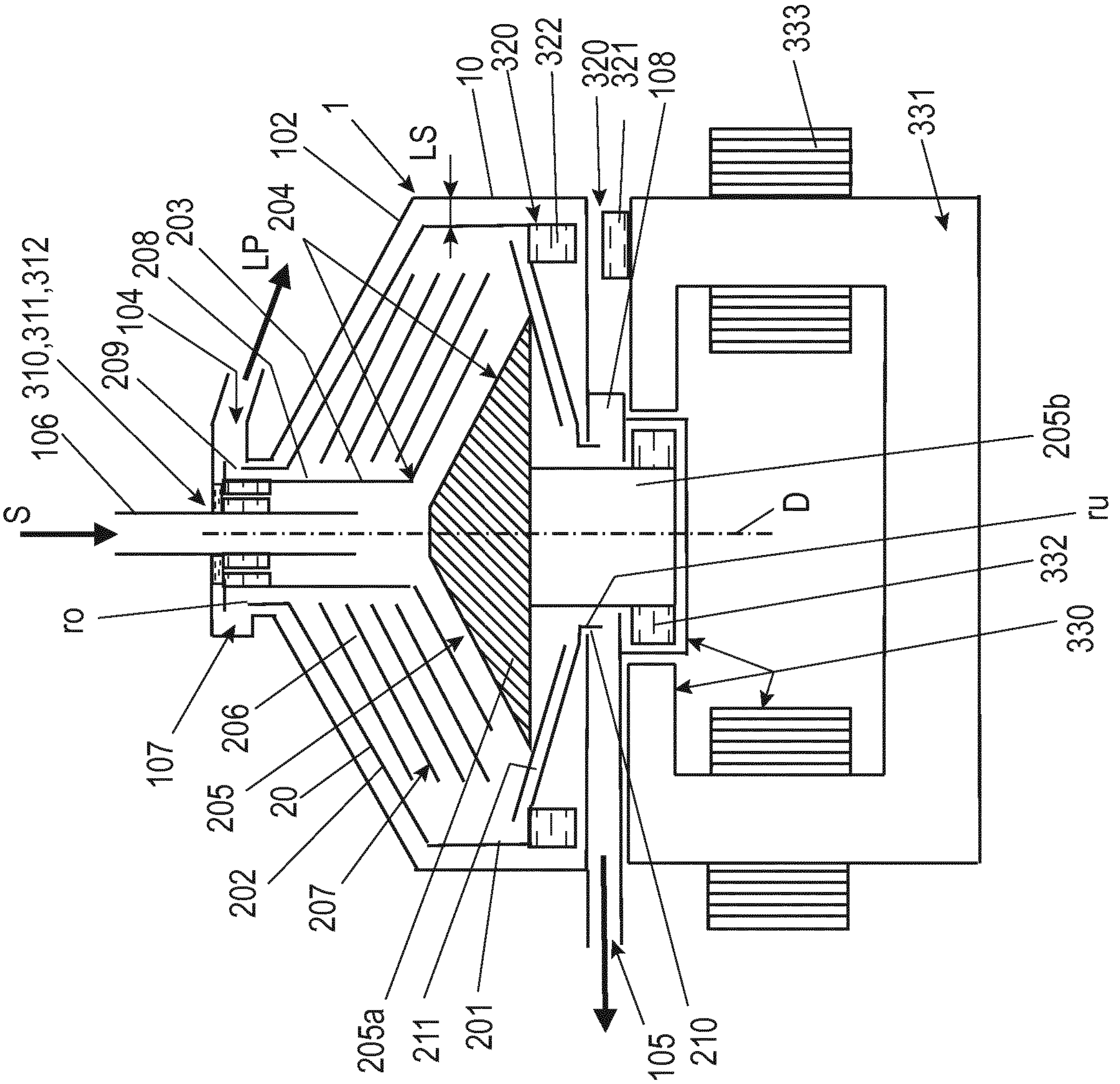
Figure 3:
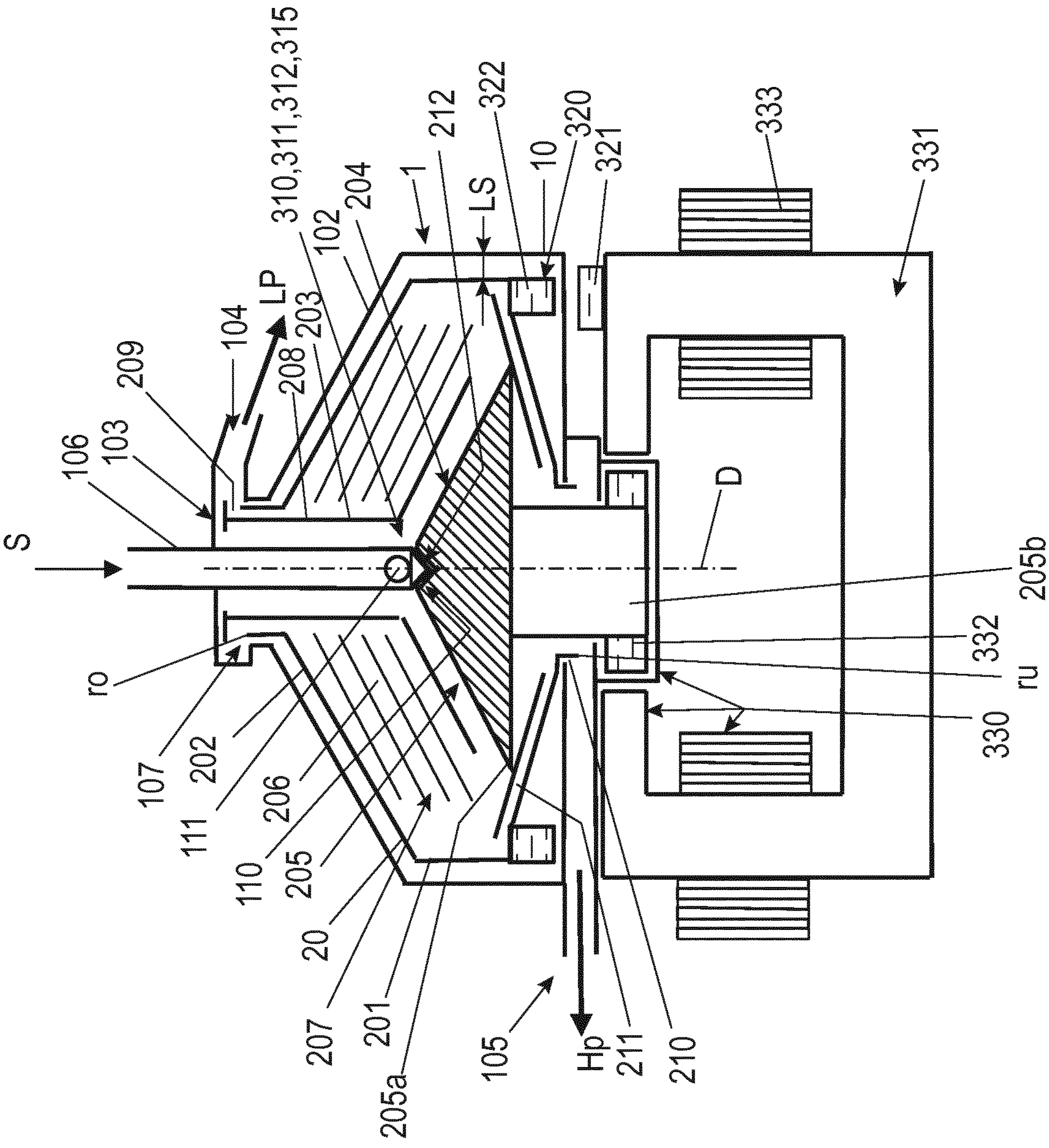
Figure 4:
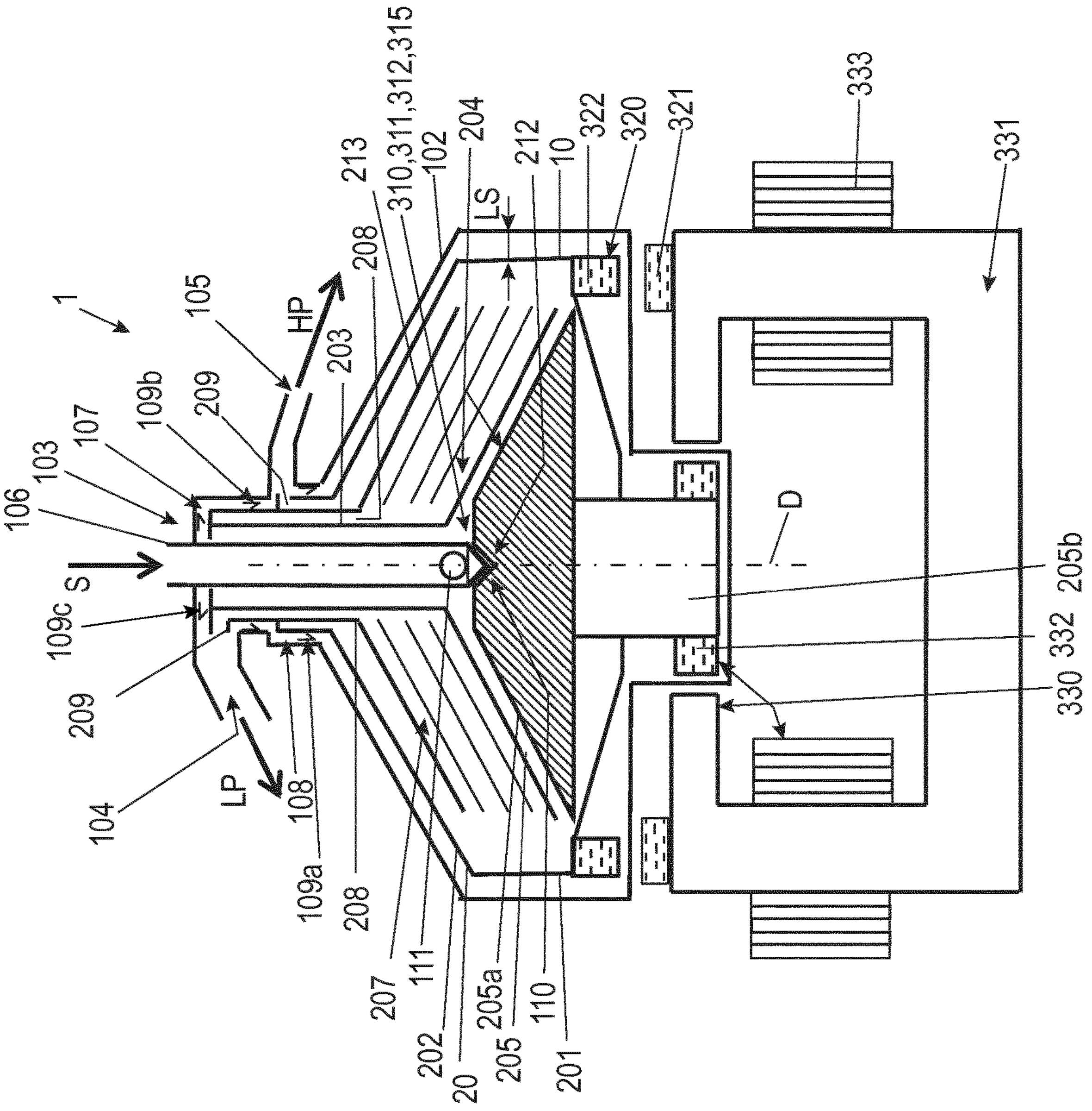
Figure 5:
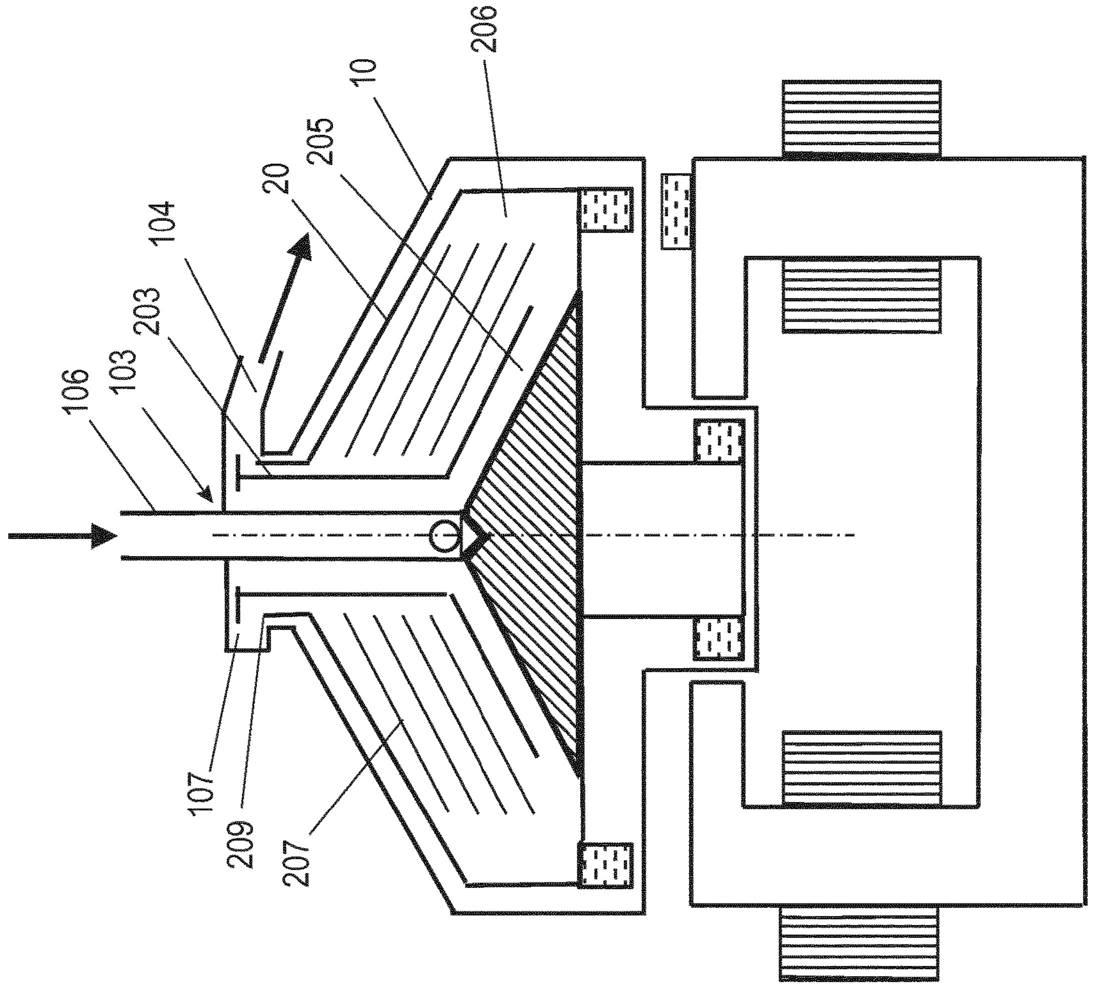
Figure 6:
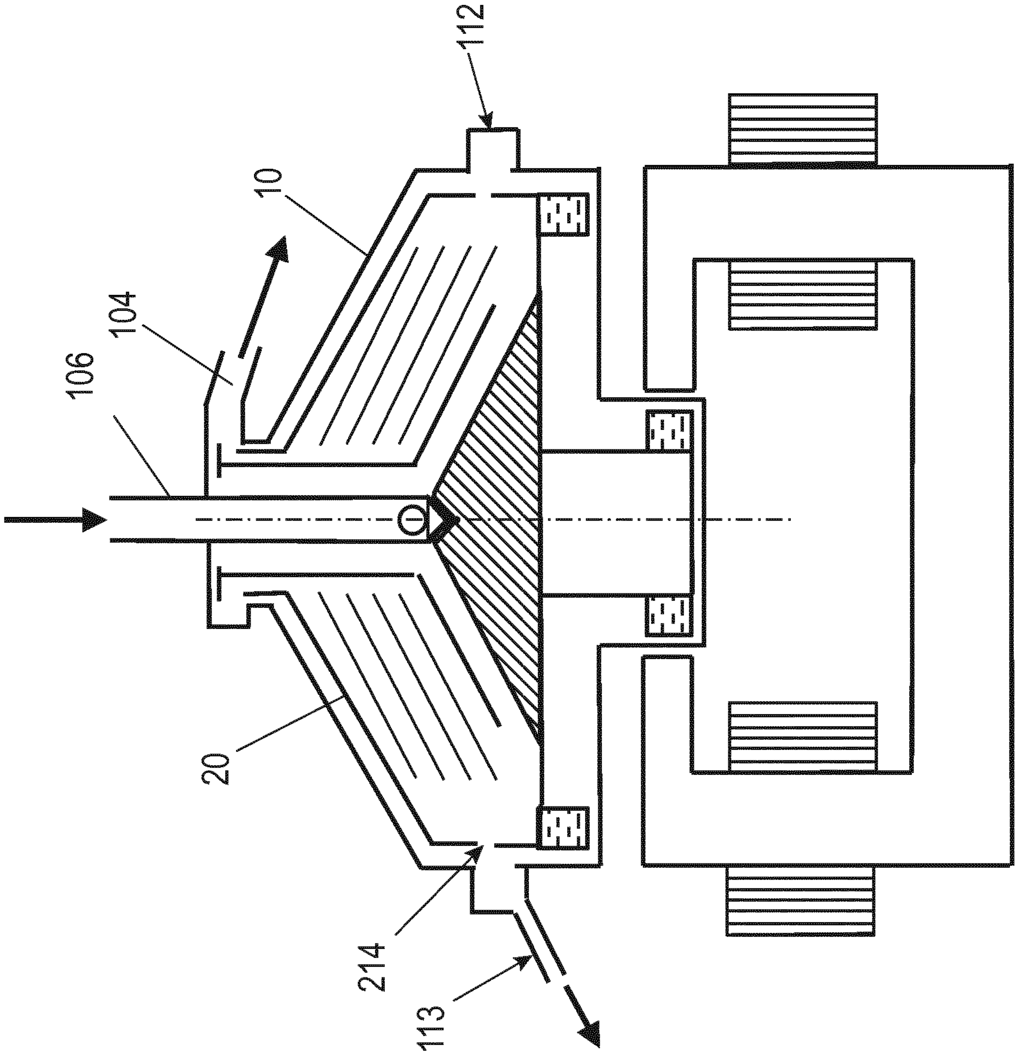

FIG. 1: shows a schematic representation of a first centrifuge;

FIG. 2: shows a schematic representation of a centrifuge according to the invention;

FIG. 3: shows a schematic representation of an embodiment variant of the centrifuge according to FIG. 2;

FIG. 4: shows a schematic representation of an embodiment variant of the centrifuge according to FIG. 3;

FIG. 5: shows a schematic representation of a further centrifuge according to the invention; and FIG. 6: shows a schematic representation of a centrifuge according to the invention.

DETAILED DESCRIPTION

A centrifuge 1 according to the prior art (see FIG. 1) has a housing 10, which is stationary during operation. This housing 10 is preferably made of a plastic material or of a plastic composite material. Here, the housing 10 has a lower cylindrical section 101 and an upper conical section 102. The lower cylindrical section may in turn be divided into cylindrical portions of different diameters.

The housing 10 is designed in the manner of a container, which is advantageously designed in a hermetically closed manner except for three openings: an inlet opening 103 and two outlets 104, 105. The inlet opening 103 is penetrated by an inlet pipe 106 extending vertically from above in the direction of the center of the housing 10. The two outlets 104, 105 extend here substantially radially.

The first outlet 104 is formed here in the upper—here conical—section 102 of the housing 10. Preferably, it is formed directly at the upper end of the housing 10. The second outlet 105, on the other hand, is formed here in the lower section 101, here cylindrical, here in the vertically lower end of a region of the cylindrical section 101 of the housing 10.

Upstream of the outlets 104, 105 are annular spaces 107, 108 of the housing. The outlets allow fluid to drain from the annular spaces 107, 108 during operation of the then rotating drum 20. The significance and beneficial effect of these annular spaces 107, 108 will be further explained below.

The outlets 104, 105 of the housing are designed here as nozzles leading radially out of the housing 10, to which lines, in particular hoses or the like (not shown here), can be connected (not shown here). Preferably, one inlet and several outlet lines, in particular outlet pipes or hoses, are connected to the inlets and outlets.

A rotatable drum 20 with an imaginary "ideal" axis of rotation D, which is a vertical axis of rotation, is arranged inside the housing 10. The real axis of rotation deviates from this "ideal axis of rotation" D due to precession movements.

The drum 20 and its components are also made entirely, or at least for the most part (ideally except for magnets to be explained), of a plastic material or of a plastic composite material. Here, the drum 20 also has a lower cylindrical section 201 and an upper conical section 202.

The inlet pipe 106 of the housing 10, like the latter, is stationary during operation. Here, it extends vertically from above through the inlet openings of the housing 10 into the drum 20 and into a distributor pipe 203 of the distributor 204 of the drum 20, which is concentric with the inlet pipe.

A bearing device 310 can be formed between the inlet pipe 106, which does not rotate during operation, and the rotating distributor pipe 203 of the drum 20. This bearing device 310 is designed as a radial bearing 311, which is preferably designed here as a magnetic bearing, which is intended to stabilize the drum 20 at its upper end during operation. This radial magnetic bearing 311 at the upper end of the drum 20—also called drum head—reduces possible oscillating movements of the drum 2 in a simple way. It comprises, for example, corresponding magnets distributed circumferentially around the inlet pipe 106 and in the distributor pipe 203, which are arranged radially to one another at defined distances and interact in the manner of magnetic bearings.

The distributor pipe 203 of the distributor 204 opens downward into radial distributor channels 205, which lead into a separation chamber or centrifugal chamber 206. A clarifying agent such as a disk pack 207 may be disposed in this separation chamber 206. The distributor 204 may have a distributor base 205*a*, which in turn has a lower cylindrical extension 205*b* that projects downward axially from the drum 20, in particular from its cylindrical section 201.

In the separation chamber 206, a suspension S to be processed, which is fed into the drum 20 through the inlet pipe 106, is separated by centrifugal force into at least two flowable phases LP and HP of different density during the driven rotational operation of the drum 20. The lower density phase LP flows radially inwardly in the separation chamber 206, where it is discharged upwardly through a first drainage channel 208 into the radial outlet 209 and is ejected radially through the radial outlet 209 from the rotating drum into the first annular chamber 107. Here, the phase LP leaves the drum at a radius ro. From there, it flows out of the housing 10 through the upper outlet 104, circling in the annular space due to its momentum.

The higher-density phase HP flows radially outwardly in the separation chamber 206 and is directed downwardly via a separating plate or annular weir 210 into a second drainage channel 211 below the annular weir 210 here first radially inwardly and is ejected radially therefrom from the rotating drum 20 into the second lower annular chamber 108. From there, this second liquid phase of greater density flows—circling in the annular space 108 due to its momentum—through the second lower outlet 105 out of the housing 10. Here, the higher-density phase HP leaves the drum at a radius ru. Through the ratio of ro to ru, the radius of the separation zone between the two phases within the disk pack can be adjusted and thus a regulation of the flow rates of the individual phases can be realized. For this purpose, the radius ru is changed in a simple manner by means of an orifice plate (not shown here).

In the vertical region between the outlets 104 and 105, the housing 10 and the drum 20 are spaced apart by an air gap LS. This is advantageous because a high rotational speed of the drum 20 can be achieved relatively easily in this way. The air gap LS does not fill in this region with one of the phases HP, LP to be discharged.

In sealed centrifuges according to the invention, as shown in FIG. 4, the gas pressure in this air gap can be reduced by a vacuum device in a further variant. This reduces the air friction of the rotating drum and thus the required drive energy for the drum. The negative pressure device can be connected for this purpose, for example, in the lower section 101 of the housing 10 (not shown).

In another variant of the sealed centrifuges according to the invention, as shown in FIG. 4, the air in the air gap (LS) can be replaced by a gas with a lower density than air, such as helium. This also reduces the air friction of the rotating drum and thus the required drive energy for the drum. An appropriate gas supply can be connected for this purpose, for example, in the lower section 101 of the housing 10 (not shown).

The drum 20 is suspended and rotated within the housing 10 by a support and drive device 30. The support and drive device 30 can have one or more support and/or drive units which can operate according to an electro-magnetic or permanent-magnetic operating principle.

Here, it preferably comprises at least two or three of these support and/or drive units.

For example, the support and drive device 30 may include the upper bearing device 310 described above as the support and/or drive unit.

The support and drive device 30 may further include a lower axially acting bearing device 320 as the support and/or drive units.

This lower axially acting bearing device 320 also serves to levitate the drum 20 axially within the housing 10. It may include first magnets 321 on an abutment, for example on the bottom of the housing or on a stator 331 below the housing 10.

In addition, the axially acting bearing device 320 may have second magnets 322 arranged axially above and spaced from the first magnets 321 in the lower region, particularly in the lower region of the drum 20.

These first and/or second magnets 321, 322 can be designed as suitably aligned or poled permanent magnets, such that the drum 1 can be held axially in suspension during rotary operation. For this purpose, these magnets 321, 322 can be arranged circumferentially or suitably circumferentially distributed on two vertically aligned circles of the same diameter in such a way that their action ensures that the drum 20 is held in suspension within the housing in an axially magnetically levitating manner. Electromagnets including a suitable control device (not shown here) can also be used for the function of the first magnets 321.

The support and drive device 30 may further include an electric motor 330 having a rotor magnet 332 formed on the drum 20 and a stator 331 and stator magnet 333 formed outside the housing 10. The drum is centered by suitable control of the stator magnets 333.

Overall, a lower support and drive unit is formed in this way. This can be operated electromagnetically. However, it can also be driven by rotating permanent magnets.

Such support and drive devices or their support and drive units are used by the company Levitronix, for example, to drive centrifugal pumps (EP2273124B1).

During operation, the drum 20 rotates, being held axially in suspension and radially centered. Preferably, the drum 20 is operated at a speed of between 1,000 and 20,000 revolutions per minute. The forces generated by the rotation lead to the separation of a suspension to be processed into different flowable phases and to their discharge, as already described in detail above.

With the described embodiment it is again possible to create a separator including housing 10 which can be designed for single use except for the drive system and parts of the bearing, which again is of interest and advantage especially with regard to the processing of pharmaceutical products such as fermentation broths or the like, since after operation for processing of a corresponding product batch in preferably continuous operation during the processing of the product batch no cleaning of the drum has to be carried out, but the separator including housing can be replaced as a whole. If necessary, individual elements such as magnets can be suitably recycled.

To avoid repetition, essentially only differences between the centrifuge 1 according to the invention and the prior art explained in detail above will be described below.

At least one of the support and/or drive units of the drum 20 of the centrifuge 1 according to the invention as shown in FIG. 2 has here at least one bearing device 310 which is designed in such a way that, in addition to a radial bearing, it also provides an axial bearing.

According to one variant, the bearing device 310 can have a radial bearing 311 and an axial bearing 312, as shown. These can—as shown—both be designed as magnetic bearings. Alternatively, it is conceivable to design them as plain bearings (see, for example, FIG. 3). There can also be provided at the top and further down on the drum in each case a support and/or drive unit with in each case a bearing device and optionally a drive unit, which in each case in addition to a radial bearing also effect an axial bearing and can optionally also be used individually or together for (rotary) drive. Then the drum 10 can be driven either at the top or at the bottom or at one of its ends or at both ends. The two support and/or drive units can also be of identical design, which is very advantageous. A control device not shown here can be used for control.

The bearing device 310—here at the upper end of the drum 20 in the first vertical alignment—also called drum head—mitigates possible oscillating movements of the drum 2 in the radial direction in a simple way.

For this purpose, the radial bearing 311 designed as a magnetic bearing here has corresponding magnets distributed circumferentially around the inlet pipe 106 and in or on the distributor pipe 203, which are radially spaced and interact in the manner of magnetic bearings.

Furthermore, the axial bearing 312 designed as a magnetic bearing has magnets which are coaxial with the inlet pipe 106 and distributed circumferentially around the inlet pipe 106, which are arranged in the manner of magnetic bearings between the drum head of the rotating drum 20 and the housing 10 and act in the axial direction.

In this way, the axis of rotation D of the drum 20 can be advantageously arranged inclined from the vertical, even if a first vertical alignment is shown in FIG. 2, which can of course also be realized. However, a quasi-arbitrary other spatial orientation of the axis of rotation D is also possible. The axis of rotation D can therefore be inclined at an angle of 45° from the vertical, for example, or it can also extend horizontally—i.e., be inclined by 90° to the vertical. Furthermore, a suspended arrangement of the drum 20 is also conceivable, so that the axis of rotation D is inclined by 180° with respect to the arrangement in FIG. 2, without causing bearing problems for the drum 20. This would be a second vertical alignment of the axis of rotation that is feasible.

One of the support and/or drive units of the drum 20 of the centrifuge 1 according to the invention of the variant shown in FIG. 3 comprises as the bearing device 310, which in addition to the radial bearing 311 also effects an axial bearing 312 of the drum 20, a bearing 315 acting obliquely to the axis of rotation D. The bearing 315 acting obliquely to the axis of rotation D is designed as a plain bearing 315.

The plain bearing 315 is formed by a centering tip 110 of a mandrel-like inlet pipe 106 and a recess 212 corresponding to the centering tip 110, which is formed by the distributor base 205*a* and in which the centering tip 110 is supported.

Due to its geometric design, the plain bearing 315 can support both radial forces and axial forces. A combined radial bearing 311 and axial bearing 312 is thus formed.

A connection to the disk pack 207 is provided by a radial opening 111, which is designed here as a bore, in the inlet pipe 106.

As a result, the axis of rotation D of the drum 20 can advantageously be arranged inclined from the first vertical as shown in FIG. 3. Any arrangement of the axis of rotation D is possible. The axis of rotation D can in turn be aligned at an angle or inclination to the first vertical as desired. For example, it can be inclined at an angle of 45° from the vertical, or it can also extend horizontally, i.e., inclined by 90° to the vertical. Furthermore, a suspended arrangement of the drum 20 is also possible, so that the axis of rotation D is inclined by 180° to the arrangement in FIG. 3 in a second vertical, without causing any bearing problems for the drum 20.

The embodiment variant of the centrifuge 1 shown in FIG. 4 may correspond to the embodiment variant shown in FIG. 3 with respect to the design of the support and drive device 30 of the drum 20.

Deviating from this, the embodiment variant of the centrifuge 1 according to FIG. 4 comprises a drum 20 in which, with the first vertical alignment of the axis of rotation D shown, the outlet 105 of the heavier phase is also arranged in the region at the upper vertical end of the drum or in the region of the drum head. The outlet 105 of the heavier phase is aligned radially. It is located axially below the outlet 104 of the lighter phase. Inside the drum, the phases to be separated are directed to these outlets accordingly. For example, the heavy phase is directed via a separating plate 213 to the outlet 105 and the lighter phase is directed radially further inwards to its outlet 104.

The outlets 104, 105 are in turn preceded by annular spaces 107, 108 of the housing. The outlets allow liquid to drain from the annular spaces 107, 108 during operation of the then rotating drum 20.

In order to seal the outlets 104, 105 and/or the annular spaces 107, 108, in particular to seal them against each other, one or more seal(s) 109 may be provided between the drum 10 and the housing 20.

In the example of FIG. 4, two radially acting seals 109*a* and *b* in the air gap seal an axially upper outer portion of the drum 10 from the axially upper inner portion of the housing 20.

Another axially acting seal 109*c* seals an axially upper wall or other boundary of the drum 10 against an axially upper wall of the housing 20.

The seal(s) 109 is/are preferably designed here as a mechanical seal. Alternatively, other seals such as Elring seals can also be used.

According to FIG. 5, it is provided that the separator is designed as a clarifying device with which a solids-laden liquid—a suspension—can be clarified from solids. For this purpose, the inlet pipe 106 extends through the upper opening 103 of the housing into the drum 20 through an upper opening in the drum. The feed of the suspension is again carried out through the distributor channels 205 into the separation chamber 206, where the solids of the suspension separate from a suspension to be clarified, in particular in the disk pack 207. They collect in the drum 20 in the area of the largest inner diameter or inner radius and accumulate there. Optionally, they form a ring of solids on the inside of the drum wall. The liquid phase clarified in this way flows inwards and then upwards out of the drum 20. The solids are not discharged, but remain in the drum and are disposed of with it after processing of a corresponding product batch. In this way, for example, a liquid can be cleaned of metal particles.

The drum 20 here has only a single upper opening from which both the inlet pipe 106 protrudes and a distributor pipe 203 extending concentrically thereto. The outlet 209 is formed between the outer circumference of an upper section of one of the distributor pipes 203 and the inner circumference of the upper end of the drum 20. From there, the purified liquid flows into an annular space 107 and from there in this case radially outwardly from the housing through the outlet 104, onto which a hose or the like may be fitted. An advantageous single-use separator is also created in this way. By way of example, the separator is otherwise constructed—in particular with regard to the bearings and/or drive device—in the manner of the separator of FIG. 3, but can also be constructed differently, for example in the manner of FIG. 1 or 2.

The separator of FIG. 6 is similar to that of FIG. 5, but is designed as a separator. In this way, a heavy phase—for example a solid phase or a liquid phase—can also be discharged from the drum. In this case, for this purpose, it is provided that the drum has two or more solids outlet nozzles 214 on its outer circumference, which pass through the drum wall (radially or obliquely to the radial) in a circumferentially distributed manner in the region of the largest inner diameter of the drum 20. During clarification of a suspension which has been fed into the drum 20 as in FIG. 5, the solids or other heavy phase thus do not continue to accumulate on the outside of the drum, but are pushed out of the drum through the solids outlet nozzles. They thus collect on the inner wall of the housing, for example, in an annular space/annular channel 112 and rotate there and are discharged from the housing 10 through an outlet and opening 113 of the housing or collected on the housing in an annular tank or the like of the housing (not shown here).

In this way, the separator is designed as a separating device with which a suspension can be separated into two flowable phases or a flowable phase and a solid phase, wherein these phases can each be conducted separately out of the housing. The term separator here thus also refers to the fact that the separated phases can be discharged separately from the drum and from the housing.

According to FIG. 5, the housing 10 has only two openings for at least one inlet and at least one outlet. According to FIG. 3, on the other hand, the housing has only three openings for at least one inlet and at least two outlets.

Alternatively, however, the housing could also have at least one further functional opening, an opening for connecting a device generating a vacuum or a negative pressure or for introducing an inert gas or the like (not shown in each case).

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

Centrifuge 1
Housing 10
Lower cylindrical section 101
Upper conical section 102
Inlet opening 103
Outlets 104, 105
Inlet pipe 106
Annular spaces 107, 108, 112
Seal 109*a*, 109*b*, 109*c*
Centering tip 110
Opening 111
Outlet 113
Drum 20
Lower cylindrical section 201
Upper conical section 202
Distributor pipe 203
Distributor 204
Distributor channels 205
Separation chamber 206

Disk pack 207
Distributor base 205*a*
Cylindrical extension 205*b*
Drainage channel 208
Derivation 209
Ring weir 210
Drainage channel 211
Recess 212
Separating plate 213
Solids outlet nozzles 214
Support and drive device 30
Upper bearing device 310
Radial bearing 311
Axial bearing 312
Plain bearing 315
Lower axial bearing device 320
First magnets 321
Stator 331
Second magnets 322
Electric motor 330
Stator 331
Rotor magnet 332
Stator magnet 333
Axis of rotation D
Suspension S
Flowable phases LP and HP
Air gap LS
Upper radius ro
Lower radius ru

The invention claimed is:

1. A separator for separating a flowable suspension in a centrifugal field into at least two flowable phases of different density, the separator comprising:

a) a housing, which is stationary in operation and is a container having at least two openings;
b) a drum arranged within the housing, having an axis of rotation, being rotatable about the axis of rotation, and having at least one opening;
c) a gap formed at least in sections or continuously between the drum and the housing;
d) a support and drive device comprising at least two support or drive units, which suspend, support, or rotate the drum within the housing;
e) wherein a first one of the at least two support or drive units comprises a magnetic bearing, which axially supports and levitates the drum,
f) wherein at least one further of the at least two support or drive units axially supports the drum, wherein the at least two support or drive units are arranged axially offset from one another in a direction of the axis of rotation, and in a first vertical alignment of the axis of rotation a lower or an upper one of the at least two support or drive units supports the drum axially and keeps the drum suspended, wherein a first one of the at least two support or drive units is a first combined bearing device which, in addition to an axial bearing, also effects a radial bearing of the drum, wherein a second or further of the at least two support or drive units is a second combined bearing device which, in addition to an axial bearing, also effects a radial bearing of the drum, and wherein the first or second combined bearing devices has a bearing acting obliquely to the axis of rotation.

2. The separator of claim 1, wherein one or both of the at least two support or drive units is/are configured to set the drum in rotation within the housing.

3. The separator of claim 1, wherein one or both of the at least two support or drive units has/have a radial bearing and an axial bearing.

4. The separator of claim 1, wherein the second combined bearing device is arranged above the magnetic bearing in the first vertical alignment of the axis of rotation.

5. The separator of claim 1, wherein the separator is configured as a clarifying device with which a suspension of solids are clarified, wherein only the clarified suspension is dischargeable from the drum.

6. The separator of claim 1, wherein the separator is configured as a separating device with which a suspension is separated into two phases, wherein both of the two phases are dischargeable from the drum.

7. The separator of claim 1, wherein the housing has at least two openings, one of the at least two openings is configured for a feed of a suspension to be processed in the centrifugal field and another of the at least two openings is configured to discharge a phase of the suspension processed in the centrifugal field.

8. The separator of claim 7, wherein the drum comprises at least one inlet and only one outlet or a plurality of outlets.

9. The separator of claim 8, wherein the inlet is an inlet pipe which, in a first vertical alignment of the axis of rotation, extends vertically from above through one of the at least two openings of the housing into the drum.

10. The separator of claim 8, wherein at least one of the outlets from the drum comprises solids outlet nozzles in a shell of the drum.

11. The separator of claim 1, wherein the housing has at least three openings.

12. The separator of claim 1, wherein the housing further comprises at least one functional opening for connecting a vacuum generating device.

13. The separator of claim 1, wherein in a first vertical alignment of the axis of rotation on the drum, a first liquid outlet is formed in an upper axial region of the drum and a second liquid outlet is formed in a lower axial region of the drum.

14. The separator of claim 1, wherein the first or second combined bearing device, has at least one or more permanently or electromagnetically acting bearings.

15. The separator of claim 1, wherein the first or second combined bearing device has at least one or more bearings acting in the manner of plain bearings.

16. The separator of claim 15, wherein the plain bearing is formed by a mandrel-like inlet pipe, which is supported with a centering tip in a corresponding recess in a distributor base.

17. The separator of claim 1, wherein the housing has exclusively two or three openings and is otherwise hermetically closed.

18. The separator of claim 1, wherein the drum has one or more solids outlet nozzles.

19. The separator of claim 1, wherein the gap is an air gap.

20. The separator of claim 1, wherein the drum and the housing are configured as a disposable separator, which can be disposed of after a single use, wherein the at least two support or drive units are configured to be removably reusable from the outside of the housing.

21. A separator for separating a flowable suspension in a centrifugal field into at least two flowable phases of different density, the separator comprising:

a) a housing, which is stationary in operation and is a container having at least two openings;

b) a drum arranged within the housing, having an axis of rotation, being rotatable about the axis of rotation, and having at least one opening;

c) a gap formed at least in sections or continuously between the drum and the housing;

d) a support and drive device comprising at least two support or drive units, which suspend, support, or rotate the drum within the housing;

e) wherein a first one of the at least two support or drive units comprises a magnetic bearing, which axially supports and levitates the drum, f) wherein at least one further of the at least two support or drive units axially supports the drum, and wherein the housing has two outlets that are radially aligned, wherein both of the two outlets are formed at the upper axial region of the drum at a first vertical alignment of the axis of rotation.

22. The separator of claim 21, wherein at least one of the two outlets is assigned a device for adjusting the separation zone within the drum.

23. The separator of claim 21, wherein one or more seals are arranged between the drum and the housing in a region of one or more of the two outlets or one or more of annular spaces.

* * * * *